United States Patent
Hill et al.

(10) Patent No.: US 9,710,760 B2
(45) Date of Patent: Jul. 18, 2017

(54) MULTI-FACET CLASSIFICATION SCHEME FOR CATALOGING OF INFORMATION ARTIFACTS

(75) Inventors: Matthew Hill, Yonkers, NY (US); John R. Kender, Leonia, NJ (US); Apostol Natsev, Harrison, NY (US); Quoc-Bao Nguyen, Stamford, CT (US); John R. Smith, New York, NY (US); Jelena Tesic, Austin, TX (US); Lexing Xie, White Plains, NY (US); Rong Yan, Mountain View, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 818 days.

(21) Appl. No.: 12/825,609

(22) Filed: Jun. 29, 2010

(65) Prior Publication Data

US 2011/0320454 A1 Dec. 29, 2011

(51) Int. Cl.
*G06F 17/30* (2006.01)
*G06N 99/00* (2010.01)

(52) U.S. Cl.
CPC ..... *G06N 99/005* (2013.01); *G06F 17/30265* (2013.01)

(58) Field of Classification Search
USPC .................................................. 707/736, 737
See application file for complete search history.

(56) References Cited

U.S. PATENT DOCUMENTS

| | | | |
|---|---|---|---|
| 6,055,540 A | 4/2000 | Snow et al. | |
| 6,185,550 B1 | 2/2001 | Snow et al. | |
| 7,085,771 B2 | 8/2006 | Chung et al. | |
| 7,349,917 B2 | 3/2008 | Forman et al. | |
| 7,383,260 B2 | 6/2008 | Smith et al. | |
| 7,610,315 B2 | 10/2009 | Chang et al. | |
| 2004/0024739 A1* | 2/2004 | Copperman et al. | 707/1 |
| 2006/0031217 A1* | 2/2006 | Smith et al. | 707/5 |
| 2007/0078695 A1 | 4/2007 | Zingelewicz et al. | |
| 2012/0185473 A1* | 7/2012 | Ponting | G06F 17/30861 707/728 |

OTHER PUBLICATIONS

Yee et al., "Faceted Metadata for Image Search and Browsing", Copyright 2003, ACM 1-58113-630-7/03/0004, pp. 1-8.*

(Continued)

*Primary Examiner* — Hung Q Pham
(74) *Attorney, Agent, or Firm* — Tutunjian & Bitetto, P.C.; Mercedes L. Hobson

(57) ABSTRACT

A system and method for constructing a hierarchical multi-faceted classification structure includes organizing a plurality of visual categories into a multi-relational reference ontology that accounts for a plurality of different types of relationships. Media artifacts are categorized into the plurality of visual categories. The categories of artifacts are refined based on faceted ontology relationships or constraints from the multi-relational reference ontology. The multi-relational reference ontology and the one or more media artifacts with relationships are stored as the hierarchical multi-faceted classification structure in computer readable memory storage.

21 Claims, 7 Drawing Sheets

(56) References Cited

OTHER PUBLICATIONS

Bechini, A., et al. "Enabling Ontology-Based Document Classification and Management in EBXML Registries" Proceedings of the 2008 ACM Symposium on Applied Computing (SAC). SAC '08. Mar. 2008. pp. 1145-1150.

Gulla, J., et al. "An Interactive Ontology Learning Workbench for Non-Experts" Proceedings of the 2nd International Workshop on Ontologies and Information Systems for the Semantic Web. ONISW '08. Oct. 2008. pp. 9-16.

Karlson, A., et al. "FATHUMB: A Facet-Based Interface for Mobile Search" Proceedings of the 2006 Conference on Human Factors in Computing Systems. CHI 2006 Proceedings—Search & Navigation: Mobiles & Audio. Apr. 2006. pp. 711-720.

Marszalek, M., et al. "Semantic Hierarchies for Visual Object Recognition" 2007 IEEE Computer Society Conference on Computer Vision and Pattern Recognition (CVPR 2007). Jun. 2007. (7 Pages).

Shi, R., et al. "Enhancing Image Annotation by Integrating Concept Ontology and Text-Based Bayesian Learning Model" Proceedings of the 15th International Conference on Multimedia 2007. MM '07. Sep. 2007. pp. 341-344.

Tsapatsoulis, N. "A Hierarchical Classification Scheme for Semantic Image Annotation" 2009 First International Conference on Advances in Multimedia. Jul. 2009. pp. 194-200.

\* cited by examiner

MULTI-FACET CLASSIFICATION SCHEME FOR CATALOGING OF INFORMATION ARTIFACTS

BACKGROUND

Technical Field

The present invention relates to classification of digital artifacts and more particularly to systems and methods for cataloging and automatically tagging artifacts.

Description of the Related Art

The digital media market is rapidly growing. On-line digital content such as, photographs and video, is typically not cataloged. However, in some instances content is professionally cataloged or cataloged by users by social tagging. For example, existing content-based solutions rely on user-initiated content tagging (Flickr™). These types of tags are usually insufficient for commercial use or for objective data description.

Taxonomies and classification schemes are tools for categorization of information entities. These structures organize a set of identified categories, where each category corresponds to a node in the hierarchy that is connected to parent and children nodes. Parent-child links can correspond to relationships based on containment, for example, where each child node is a specialized variation of its parent. Other parent-child relationships are possible, such as to indicate that the child is part of the parent.

A multi-facet taxonomy extends this basic representation by allowing multiple parallel hierarchies, where each represents a different aspect for decomposing or hierarchically relating the categories. Multi-facet taxonomies are useful for aiding search based on hierarchical navigation since they allow parallel navigation along multiple dimensions or properties of the information entities. However, multi-faceted taxonomies are limited as a tool for categorization since they do not provide a complete decomposition of the semantic space corresponding to the information entities.

SUMMARY

A system and method for constructing a hierarchical multi-faceted classification structure includes organizing a plurality of visual categories into a multi-relational reference ontology that accounts for a plurality of different types of relationships. Media artifacts are categorized into the plurality of visual categories. Labeling of artifacts is refined based on faceted ontology relationships or constraints from the multi-relational reference ontology. The multi-relational reference ontology and the one or more media artifacts with relationships are stored as the hierarchical multi-faceted classification structure in computer readable memory storage.

A method for constructing a hierarchical multi-faceted classification structure includes classifying a plurality of visual categories into a multi-relational reference ontology that accounts for a plurality of different types of relationships; categorizing one or more media artifacts into the plurality of visual categories; and storing the multi-relational reference ontology and the one or more media artifacts with relationships as a hierarchical multi-faceted classification structure in computer readable memory storage.

A method for training a visual classifier using a hierarchical multi-faceted classification structure includes classifying a plurality of visual categories into a multi-relational reference ontology that accounts for a plurality of different types of relationships; collecting media artifacts from the plurality of visual categories using multi-facet logical relationships such that the media artifacts collected are guaranteed to be mutually exclusive with a given target class; and training a visual classifier stored in computer readable storage media with the media artifacts collected in the collecting step.

A system for constructing a hierarchical multi-faceted classification structure includes a visual classifier module stored in computer readable storage media and configured to classify a plurality of visual categories into a multi-relational reference ontology that accounts for a plurality of different types of relationships. A categorizing module is configured to place one or more media artifacts into the plurality of visual categories. A refinement module is configured to refine an output of the categorizing module based on at least one of faceted ontology relationships and constraints from the multi-relational reference ontology. A hierarchical multi-faceted classification structure is stored computer readable memory storage and is configured to relate the one or more media artifacts in the multi-relational reference ontology.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1A:
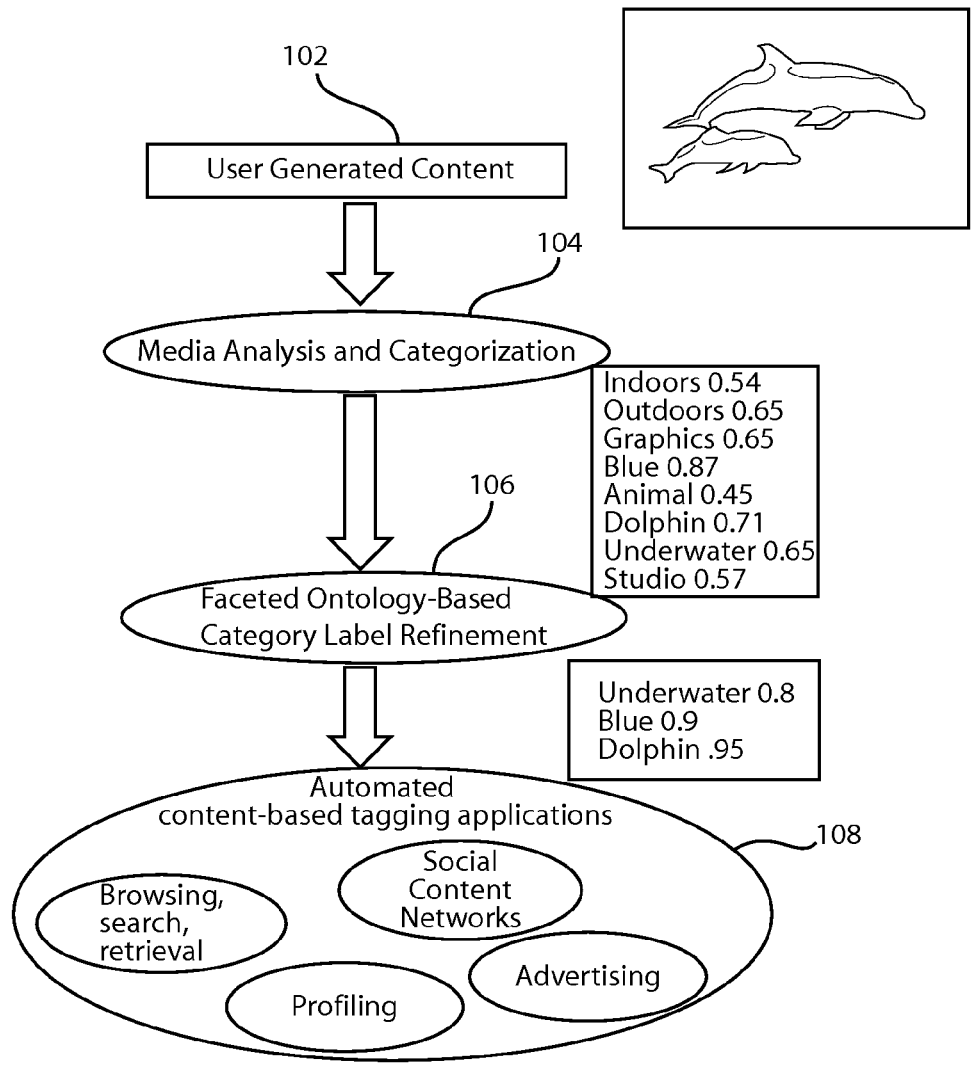
FIG. 1A is a block/flow diagram showing a multi-faceted classification with label refinement and automated tagging in accordance with one illustrative embodiment.

In accordance with the present principles, systems and methods are provided that include a set of rules and constraints for the construction and maintenance of multi-facet taxonomies that permit a complete determination of a membership of each artifact with respect to each category. Multifaceted taxonomy can be used in classifying images. Automated semantic classification includes content-based classification of images which assigns labels to a media artifact. A flat list of labels and confidences does not provide real meaning or relations among labels for a particular artifact. Automated tagging of a content item needs to be precise, reliable, diverse, scalable and adaptable.

In accordance with the present principles, systematic organization of visual semantic concepts enables better classification. Relationships among visual semantic concepts are complex ones, and include a great wealth of information. Utilizing context in a classification scheme can enhance visual concepts from semantic relations, infer visual concepts from noisy observations, and improve automatic category labeling (content tagging), among other things.

In accordance with one illustrative embodiment, a set of rules and constraints for construction and maintenance of a hierarchical multi-facet classification system/method follows. Images or artifacts are categorized. Each category represents a unique semantic idea and is represented as a node, called a category node. Each category node is optionally linked to one or more children nodes that reflect semantic decomposition of the parent category. Children nodes are all of one type—category nodes or facet nodes. Children category nodes follow a semantic categorical partitioning with respect to the parent nodes, and facet nodes follow a semantic perspective partitioning. Every child category folder has at least one sibling. Children nodes of each parent are mutually exclusive and complete with respect to the semantics of the parent category. A facet node is complete with respect to the parent category and provides a perspective for further decomposing the parent category into parallel semantic categorical decompositions. Peer facet nodes are redundant with respect to each other. A further explanation of the rules and constraints as well as illustrative examples will be further described hereinafter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to the drawings in which like numerals represent the same or similar elements and initially to FIG. 1A, a block/flow diagram illustratively depicts a system/method for ontology-based category label refinement in accordance with one embodiment. In block 102, content is generated or otherwise obtained. Content may include any artifact including a photograph, digital image, video, graphic, etc. The content in one illustrative example includes a photo of dolphins in the ocean. In block 104, categorize media items into visual semantic classes. Classifiers or classification is performed that effectively discriminates at a semantic level, and leverages multimodal taxonomy to improve the selection of the classification labels to be used for automated tagging (e.g., a multi-faceted classification). The categories with confidence score, in our example, may include: Indoors 0.54, Outdoors 0.65, Graphics 0.65, Blue 0.87, Logo 0.61 Animal 0.45, Dolphin 0.71, Underwater 0.65, Studio 0.57.

In block 106, categorization based on faceted ontology properties or constraints (mutual exclusivity, co-occurrence, relatedness, etc.) is refined. The category label refinement is through an interactive and iterative process of deriving refined category labels at different depths of the ontology. The types of relationships in the reference ontology are preferably defined as relationships among visual semantic concepts, i.e. semantic, appearance-based, co-occurrence-based, statistical, etc. The digital media categorization may be based on machine learning and statistical classification methods, e.g., Bayes Network, SVM, KNN, HMM, GMM, MaxEnt, etc. The category label refinement is preferably through an interactive and iterative process of deriving refined category labels at different depths of the ontology.

The refinement may include one or more of selecting, boosting and excluding category labels using relationship rules extracted from the reference ontology (e.g., mutual exclusion of siblings, parent-child, etc.), using statistical methods (e.g., Bayesian probabilistic models) based on relationships in the reference ontology, detecting confidence scores for categories (e.g., their ascendants, descendents, siblings, or other related nodes), using characteristics of categories in the reference ontology (e.g., relevance to specific domains, leaf or internal node, depth in the tree, number of siblings, number of descendents, number of other related nodes), etc.

The refinement categories in our example may include: Underwater 0.8, Blue 0.9, Dolphin 0.95. A multi-relational faceted ontology is created that accounts for multiple concept relationships (parent-child, sibling, negation, etc.). In block 108, the refined set of (more accurate) category labels is leveraged to enable/improve a variety of content-based tagging applications. These may include, e.g., web browsing, search, artifact retrieval, profiling, social content networks, advertising, etc.

Multi-class classification performance is significantly improved over conventional methods. In accordance with the present principles, manual effort and cost are reduced. Media collection efforts can be bootstrapped for training data (cycle reduced). The present principles can help monetize content, improve search, asset reuse, and produce a return on investment. In addition, better performance (better accuracy of classification) for many content-based applications will be enabled. Inconsistencies can be removed (e.g., Outdoor and Indoor) as well as redundancies (Outdoor, Sky). An illustrative evaluation with 455 classifiers on a 165K set resulted in 12 refined labels per image (versus 109 labels per image without refinement).

Figure 1B:
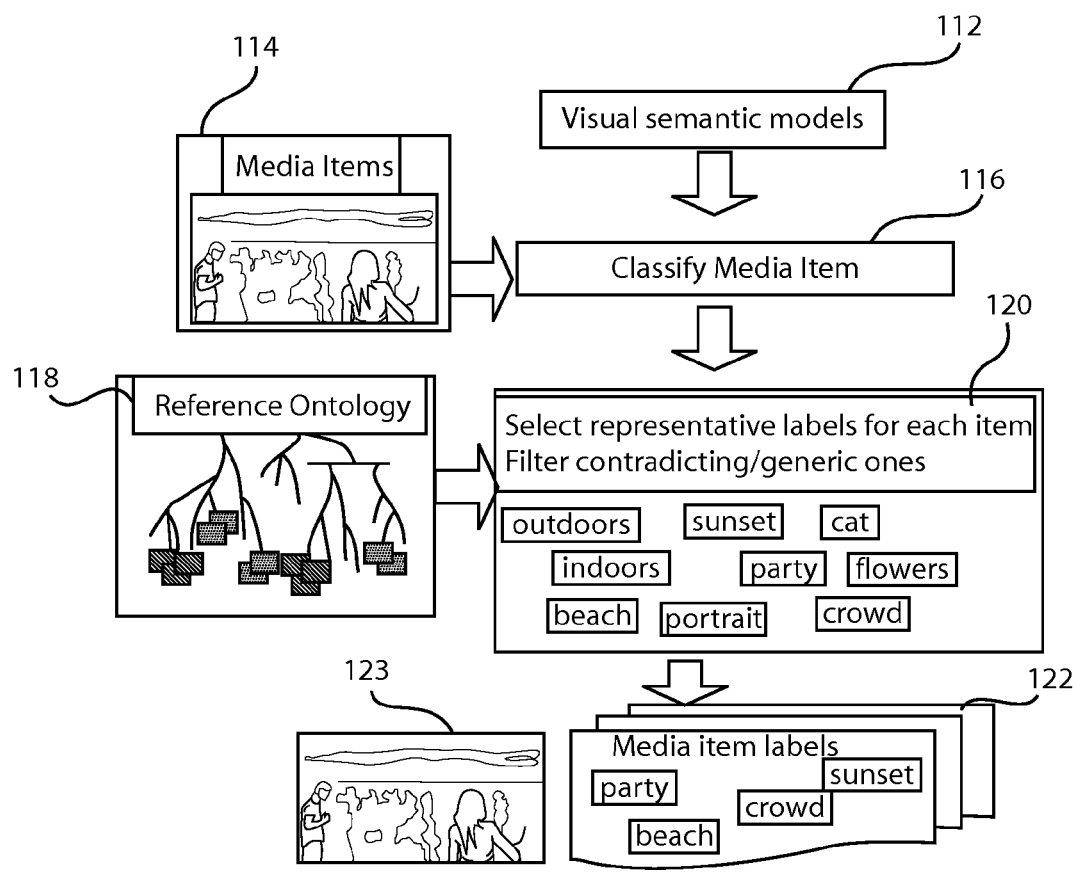
FIG. 1B is a block/flow diagram showing another multi-faceted classification with label refinement in accordance with another illustrative embodiment.

Referring to FIG. 1B, a block/flow diagram illustratively depicts a system/method for ontology-based category label refinement in accordance with another embodiment. In block 112, visual semantic models are provided. Media items 114 are input to a classifier 116. A reference ontology 118 is designed to cover the depth and the breadth of a target semantic space (or to represent a specific domain of interest). For example, a reference ontology may provide a way to classify members of an organization using descriptors that include job titles, departments, organization, etc. Visual semantic classifiers (116) may be employed to model nodes in the reference ontology. Classification may be done using any content based classification method, e.g., IBM Multimedia Analysis and Retrieval System (IMARS)™.

Category label refinement is provided in block 120. Representative labels (e.g., outdoors, indoors, beach, sunset, party, portrait, cat flowers, crowd) are selected for each item 114 and may include label selection for inclusion (subsetting), label selection for exclusion (filtering), label confidence modifications (e.g., boosting), etc. In this example, an image (114) of a beach party at sunset is provided. The refinement employs rules and constraints to narrow or filter the categories discovered during classification (e.g., contradicting or generic Winds). The category label refinements can be based on rule-based (deterministic) methods that account for wide range of relationships and constraints, Bayesian (probabilistic) methods that account for uncertainty in observations.

Category label refinement may be based on properties of nodes (leaf or internal, domain-specific, number of siblings, number of descendents, depth in tree, etc.); confidence scores of nodes, parents, ancestors, descendents, siblings, other related nodes; minimum or maximum depth in a taxonomy forest; minimum or maximum range of classification confidences; include/exclude non-leaf nodes; include/exclude specific domain/facet/subset, etc. In block 122, media item labels are produced that are more accurate and/or specific to the media item being classified. Image 114 may be tagged using the improved item labels to provide image 123.

Figure 2:
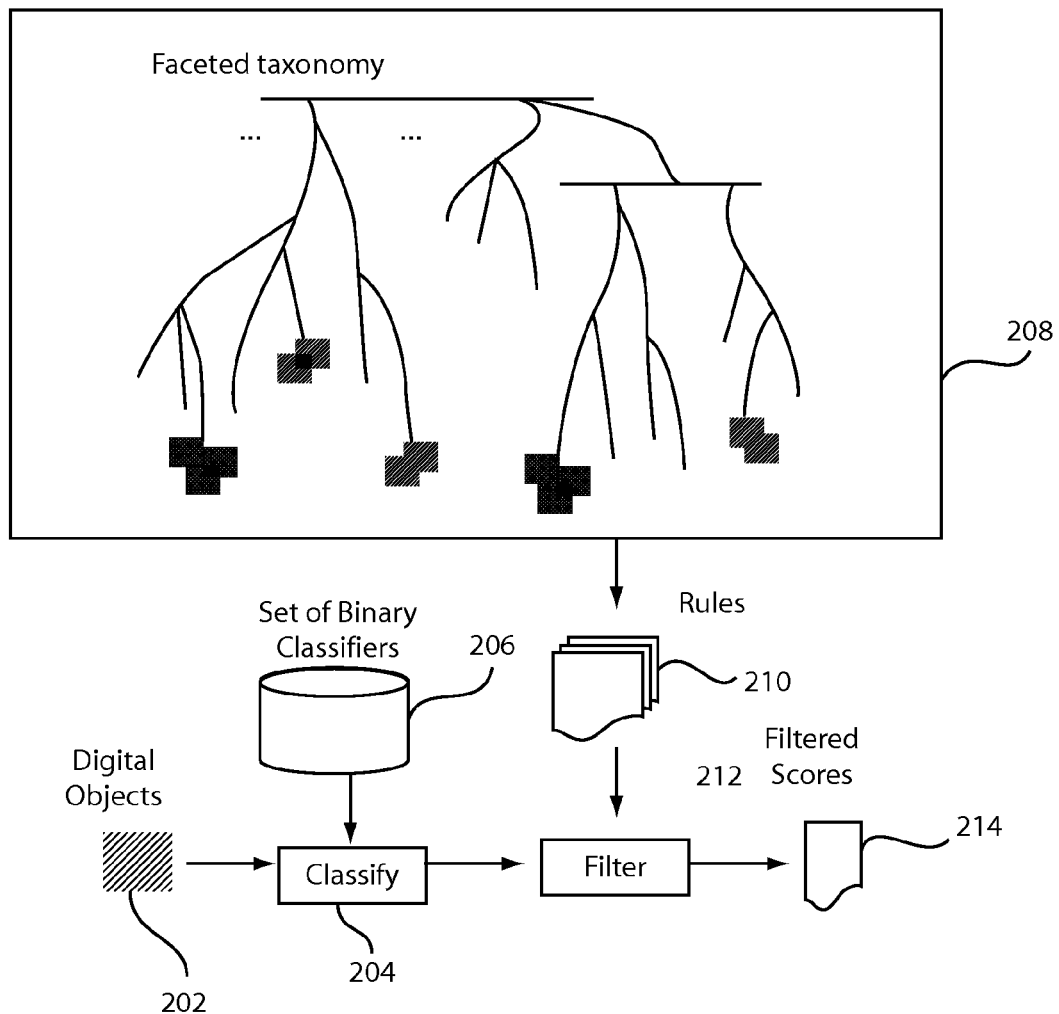
FIG. 2 is a block/flow diagram showing a multi-faceted classification with filter scores in accordance with rules for a faceted taxonomy in accordance with one illustrative embodiment.

Referring to FIG. 2, a system/method is shown for bucketizing artifacts in accordance with the present principles. Digital objects/artifacts 202 are input into the system. The artifacts 202 are classified in block 204 using a set of classifiers 206 (e.g., a visual classifier or binary classifiers). A faceted taxonomy 208 is provided. The faceted taxonomy 208 clearly defines the semantic-based rules 210 for every facet, e.g., parent-child, mutual exclusion of sibling nodes, etc. The categorization/classification from block 204 is refined in block 212 based on the faceted ontology properties or constraints from block 210. These properties or constraints may include mutual exclusivity, co-occurrence, related-ness, etc.

Binary classification results are improved by the post-filtering step of block 212 based on the taxonomy rules (210). The post-filtering adjusts resulting scores of the classifier with respect to node parents (e.g., conditional scores). The filter of block 212 filters out any contradicting scores as well. In block 214, a set of most probable labels (filtered cores) under a multi-relational ontology constraint is output.

TAG VOCABULARY CONSTRUCTION: A good set of target tags is the foundation of an automated tagging system. There are three desired properties for visual tags: (a) popular, to cover as many images and users as possible; (b) visually observable, to focus on the image content, rather than subjectivity or context. (c) machine learnable, to ensure high accuracy for automated tagging systems. In one embodiment, we case-normalize the tags, filter out non-alphanumeric characters, and exclude rare tags with counts less than 100. We can collect frequency counts of tags and further prune the vocabulary off rare tags (e.g., tagged less than x times, or 1/1000th of the most popular tag, etc.). This leaves a set of tags of top popularity, which are the tags perceived as most important or useful by users. Note that many of these popular tags refer to contextual information that may not be present or observable in the image itself (e.g., 2008, July, family, fun, USA). We use a data set to further select visually observable tags. The set includes recorded words that two independent users agree on for the same image, which naturally favors the most relevant and nonsubjective visually observable tags. The most frequently occurring tags are good representatives of unambiguous tags purely from visual appearance, and do not require contextual information on when, where, how, or why a photo was taken. We keep tags that are popular in both lists (by taking the max. rank), and this results in a final prioritized list of tags, which are both frequently appearing, popularly used, and visually observable.

To study the effect of such tag filtering and selection strategy, we manually analyze the top, e.g., 500 tags, and categorize them into visual, contextual (e.g., events, holidays), dates/times, named entities (e.g., locations, brands, people), and other non-visual tags (e.g., too abstract, ambiguous, emotional, or subjective), similar to existing tag classification schemes.

We further select a machine learnable subset in this vocabulary. We start from the visual tags in a top 500 list, we group synonyms, as well as related but visually indistinguishable categories such as cat and dog. We trained 105 classifiers, and selected a subset of 60 classifiers that perform well and have sufficient coverage on an independent validation set.

CLASSIFIER SCORE CALIBRATION: We used an ensemble of bagged SVM classifiers to generate initial classification scores. Other classifiers may also be employed. Calibrating SVM output scores includes estimating output probability from the score, or choosing a cut-off threshold that is typically away from zero. Let s∈R denote classification score, y=±1 denote the binary class label. y and s can be parameterized in the feature space with a cosine series expansion in a direction orthogonal to the separating hyperplane. Directly parameterizing the output score in the feature space needs solving of a linear system for every evaluation of the SVM, which is difficult to carry out in high-dimensional nonlinear feature space. A logistic model for the class posterior given a score may be employed as is known in the art, i.e.

$$p(y=1|s) = \frac{1}{1+\exp(as+b)}.$$

This model is learnable from data, simple to use and widely employed. However, noise is often too great for the learning to yield meaningful results, and a single logistics model has difficulty fitting an SVM ensemble when each unit classifier has different probability mappings.

We employ the following smoothed non-parametric estimate to calibrate SVM scores. We obtain empirical estimates of $P(y=1|s \geq s_0)$ from a separate validation set, and we perform a piece-wise linear fit to the observations. For each positive data point with score $s_i$ in the validation set, $P(y=1|s \geq s_i)$ is taken as the fraction of positive points with scores no less than $s_i$:

$$P(y=1|s \geq s_i) = \frac{\#(y=1, s \geq s_i)}{\#(s \geq s_i)}.$$

We choose a series of control points $p_c$ at every 0.05 interval in [0.25, 0.95]. We then estimate value of $s_c$ that satisfies $P(y=1|s \geq s_c)=p_c$. We use a five-point local triangle window to smooth the estimates, ensuring that the $(p_c,s_c)$ pairs are monotonically increasing. Using such a non-parametric model on the cumulative probability of y is more robust to outliers since the precision is computed over a range of s instead of a local neighborhood, and it can adapt to uneven local gradients over s versus p, commonly seen with a classifier ensemble. Furthermore, $P(y=1|s \geq s_0)$ gives a direct estimate of accuracy if we were to threshold scores at $s_0$.

Probability calibrations are needed using validation data points on the same visual concept "meeting", plotting accumulated or local precision estimates versus raw classifier scores. We can see that this is unsuitable for fitting local precision estimates, while we can still get a smoothed accumulated precision. Note that calibration should be performed for tag ranking.

TAXONOMY-BASED TAG REFINEMENT: We use a faceted tag taxonomy, which encodes external knowledge about the relationships and structure between the target visual tags, and which can be used to eliminate conflicting tags and to automatically infer additional correct ones. A key question is how to encode the tag relationship information so that it can be used for automatic reasoning. While there are various large concept ontologies based on linguistic relationships, visual vocabularies are much scarcer, the Large-Scale Concept Ontology for Multimedia, or LSCOM, is arguably the largest visual ontology, consisting of over 2,000 visual concepts related to broadcast news video that are linked in to a subset of Cyc. However, LSCOM was primarily designed to meet the needs of broadcasters and analysts of professionally produced content rather than social media users.

Furthermore, traditional hierarchical tree taxonomies are not very suitable for automatic reasoning and refinement of visual categories since the latter are inherently fuzzy. For example, a photo from inside a room, looking through a window, depicts both indoor and outdoor aspects, which is a virtual impossibility if we consider only the semantic relationships of these two concepts. Similarly, a photo can depict many concepts at the same time, and is therefore unlike words, which is what linguistic taxonomies are designed to organize. We tackle the above problems by introducing a faceted taxonomy of visual concepts, where faceted nodes represent independent visual aspects that can co-occur within an image, and regular category nodes represent mutually exclusive concepts that rarely co-occur in an image. The faceted taxonomy of the 60 target visual concepts is illustrated in FIG. 3.

Figure 3:
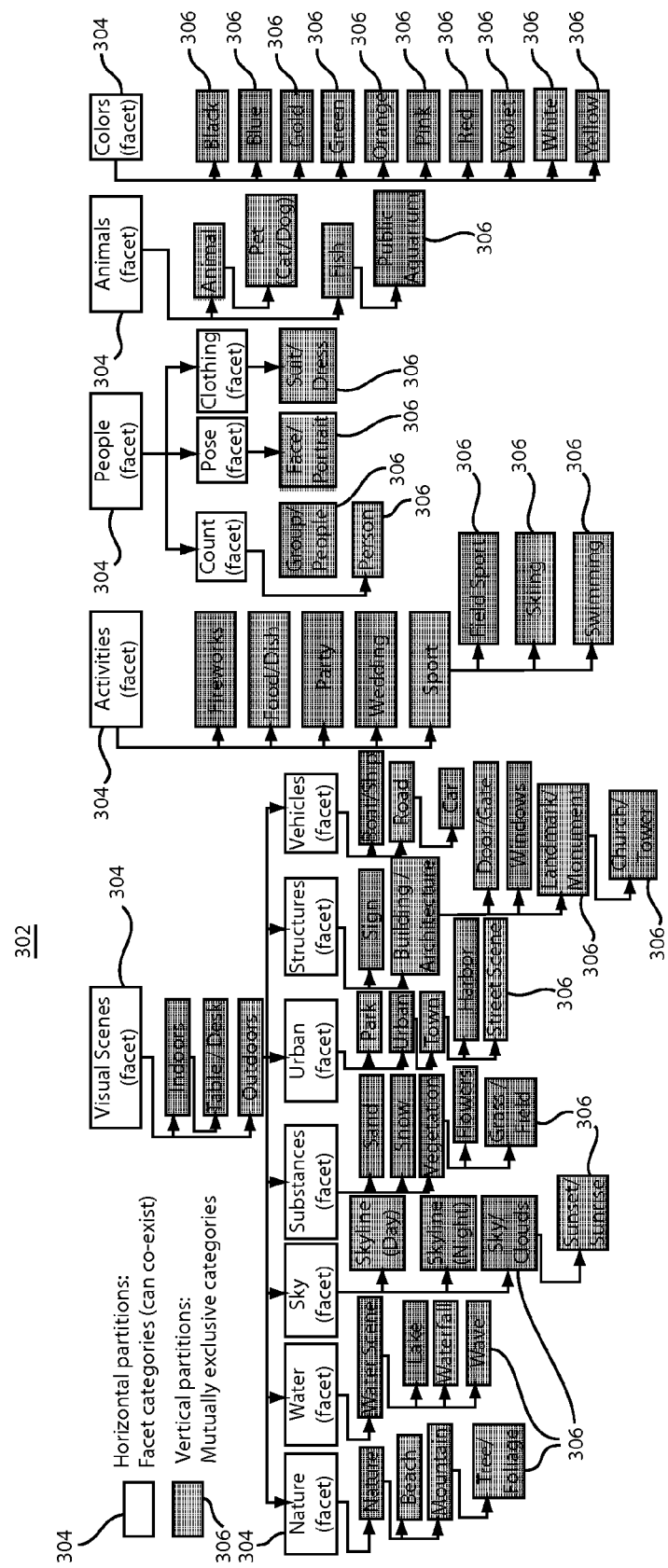
FIG. 3 is a block/flow diagram showing a multi-faceted classification taxonomy in accordance with one illustrative embodiment.

Referring to FIG. 3, a hierarchical multi-faceted taxonomy 302 of 60 target visual tags is illustratively shown. Taxonomy 302 includes faceted tags 304 and mutually exclusive tags 306. Faceted tags 304 (horizontally partitioned) capture independent visual aspects and can co-occur, while mutually exclusive tags 306 (vertically partitioned) do not co-occur. Note that taxonomy design is subjective, and there are always examples that violate the encoded relationships, e.g., mutual exclusivity. The taxonomy 302 is a tool to minimize tagging errors and improve overall tagging quality, even if some of the relationships can clearly be violated (e.g., we intentionally force a choice between door and windows to emphasize the dominant aspect of images).

The faceted taxonomy penults improvement of the set of recommended tags for an image in a number of ways: 1) Precision: We can eliminate conflicting tags that appear as mutually exclusive siblings in the taxonomy by selecting at most one such sibling (e.g., choose indoor vs. outdoor, sand vs. snow vs. vegetation, etc.). 2) Recall: We can augment the set of tags by propagating tag confidence scores bottom-up in the taxonomy (e.g., mountain implies nature). 3) Clarity: We can disambiguate meaning of otherwise similar tags by explicitly encoding parent-child relationships between them (e.g., urban→town). 4) Usability: We can prioritize and re-rank tags based on their depth in the taxonomy, since users would typically prefer to see more specific tags (e.g., church/tower>>landmark>>building>>urban).

VALUE-BASED TAG RE-RANKING: The best tag for an image is not necessarily the one with the highest precision estimate. Tag recommendation under uncertainty tries to find a trade-off between the accuracy of tags being issued, the perceived usefulness of each tag, and the risk of issuing a wrong tag. We present several approaches for obtaining an overall tag importance value, and we multiply the precision-normalized tag scores by the estimated tag values to re-rank suggested tags based on a combination of tag relevance and tag importance.

Re-ranking may be provided by: perceived tag value (based on popular ratings (subjective)), tag information content (employ measuring the usefulness of observing a probabilistic event (e.g. observing visual concept c) is the information content (IC), measured as the negative logarithm on the probability of the event. The IC re-ranking factor for each visual concept is simply:

$$f_{ic}(c) = IC(c) = \log \frac{1}{P(c)} = -\log(P(c))'.$$

Re-ranking may also be by tag popularity or by re-ranking using tag posterior probability (the less expected a tag is and the higher its utility, the larger its importance for ranking purposes). We examine the probability P(u|I) of a tag u being assigned to an image I by an arbitrary user. We unroll this conditional probability on the actual presence of a corresponding visual tag c in the image:

$$P(u|I) = P(c|I) \cdot P(u|c,I) P(\bar{c}|I) \cdot P(u|\bar{c},I) \approx P(c|I) \cdot P(u|c).$$

We can further assume that u is independent of/once c is given, which the first term to P(c|I)·P(u|c). This is a reasonable assumption to make, essentially stating that once the relevance of a tag to a given image is known, the image itself is no longer required to determine if the user will apply the corresponding tag, and the latter becomes a function only of the user tagging preferences.

Furthermore, the second component in the above formulation is a product of two terms involving the absence of the visual tag, $\bar{c}$. Note that P(u|$\bar{c}$,I) encodes the chance that a user will apply the tag to the image even though the tag is not relevant to the image, essentially producing a semantic "false alarm". While this is unfortunately a frequent phenomenon in user photo tagging (e.g., bulk-tagging all vacation photos as beach), it is certainly an undesirable behavior for an automatic visual tagging system. We therefore set this factor to zero and only model the first component of P(u|I). For the remaining part, we apply Bayes rule to further factorize P(u|c), yielding three terms, P(u), P(c), and P(c|u):

$$P(u|I) \approx P(c|I) \cdot \frac{P(u)}{P(c)} \cdot P(c|u) \approx \alpha P_c \frac{P(u)}{P(c)}.$$

P(c) is the prior probability of observing visual tag c as visually present in a random image, which can be estimated from large corpus statistics. P(u) is the prior probability of an arbitrary user applying tag u to an arbitrary image, which can be estimated as the fraction of photos bearing tag u. For P(c), we use the estimated validation set prior, and for P(u), we use the tag count divided by a total number of artifacts. P(c|u) is the fraction of photos tagged with a given tag that are actually relevant to that tag. For a large photo pool, this should be a tag-agnostic constant (denoted as α). We denote the photo-specific confidence P(c|I) with shorthand $P_c$, and we estimate it from the calibrated classifier scores.

We name the ratio P(u)/P(c) the likelihood-ratio factor, and use it to re-weight the calibrated confidence values, $P_c$, for tag re-ranking purposes. Note that this re-weighting factor combines the heuristics from above as it gives more weight to popular tags, yet de-emphasizes tags that are not specific and discriminant, performing a trade-off with the estimated classification accuracy.

$$f_{lr}(u, c) = \frac{P(u)}{P(c)}.$$

Each of the re-ranking factors f may serve as a re-scoring factor for the classifier confidence among the different tags within the same image. We simply multiply these factors with the classifier confidence. $P_s^*(u) = P_s \cdot f(u)$. Note that a few pre-processing steps and assumptions have made the construction of our weighting factor easy. Mapping both the visual and text tags to the same vocabulary makes each re-ranking factor f a single score list on all 60 concepts. Multiple word senses may be considered (e.g., apple being both fruit and a class of electronic products), but may not seem prevalent in our controlled vocabulary of 60 visual tags, while models from prior research can be used to disambiguate tags.

Organizing visual semantic knowledge systematically is a challenge for large-scale concept detection, and one that is complementary to optimizing visual classification for individual concepts. Semantic concepts have traditionally been treated as isolated nodes, a densely-connected web, or a tree.

None of these models are sufficient in modeling the typical relationships on a real-world visual taxonomy, and these relationships belong to three broad categories—semantic, appearance and statistics. Probabilistic visual concept trees for modeling a taxonomy forest with observation uncertainty are provided. As a Bayesian network with parameter constraints, this model is flexible enough to account for the assumptions in all three types of taxonomy relations, yet it is robust enough to accommodate expansion or deletion in a taxonomy.

LARGE TAXONOMIES FOR VISUAL SEMANTICS: To design taxonomy-aware concept models, we start by examining the different types of concept relationships in images and videos. A list of useful relationships based on a generic semantic knowledge base included two semantic-driven relationships that are broadly applicable and robust to taxonomy variations, two appearance-driven relationships frequently seen in image and video collections, and two statistics-driven aspects accounting for uncertainty in data collections.

Semantic-driven relations: In modeling both image and video, the primary interest is in semantics that are "visually detectable". These include concrete nouns and a subset of verbs that can be captured in a visual scene or translated to the corresponding noun, e.g., protest, concert, walking. A concrete noun refers to objects and substances, including people and animals, that exist physically, e.g., chair, apple, clock. An abstract noun refers to states, events, concepts, feelings, qualities, etc., that have no physical existence. e.g., freedom, happiness, music. A generic semantic lexicon such as the WordNet has more than a dozen relations among nouns, verbs, adjectives and adverbs. We specifically choose two types of relations for visual taxonomy: (1) Parent-children relationships. This maps to hypernyms and hyponyms in WordNet terms, i.e. every instance of concept A is a (kind of) concept B. An apple is a fruit, and walking is a kind of movement for instance. (2) Mutual exclusion. This maps to coordinated terms in WordNet which share a common hypernym. Apple, orange and watermelon, walking and jogging are examples of mutually exclusive concept sets.

We choose these two relations as they are applicable to concrete nouns and verbs, and they are robust to typical visual appearance variations. For example, the "part-of" relationship (holonym and meronym in WordNet) is often violated in visual appearances, as we often see photographs of a window without the building it is attached to, or close-up shots of a tree without its trunk visible. These two relations can be identified in limited context when working on a single piece of image or video segment. The "entailment" relationship (A is a result of B), on the other hand, needs more than one image or video to be analyzed in the order of causality and temporal precedence, i.e. we do not have knowledge of a soccer match just by seeing the award ceremony that followed.

Appearance-driven relations: A picture is worth a thousand words. Grounded on image and video datasets for recognition, this means that (1) more often than not an image is associated with multiple labels, such as park, party, crowd, trees, and (2) there is often more than one way that we can use to further classify a concept. For example pictures containing people can be further classified according to the number of people, the age of the people, their poses and actions, or their occupations.

Statistics-driven relations: One goal is to infer visual concepts from noisy observations, including low-level features computed directly from images, or predictions from mid-level semantic classifiers. There are again two main types of uncertainties in the observations: (1) Relationships between concepts and observations, such as combining two classifiers with 65% and 60% accuracies would help infer the true labels more accurately than either of the two alone. (2) Statistical relationships among observations, possibly upon different concepts that do not have a clearly prescribed relationship in the taxonomy. Such as seeing beach and palm trees in a picture enhances the likelihood of also seeing sky. Although the extent of these two relations can vary with respect to how the observations are obtained and also how the data are used for learning and classification.

Another reason why we choose the above six out of other possible relations is to account for the flexibility and fluidity of a large-scale visual taxonomy. Unlike classifying living species, there is no Linnaean taxonomy of visual semantics—people's view of what's worth classifying and how to classify it will necessarily change depending on ones' application domain, data collection, as well as incomplete knowledge about the semantics. Moreover, a taxonomy can grow over time, as new concepts and new categories evolve, such as Wii as a new video game system and Web2.0 as a reference to web-based communities and hosted services. Note that semantic relations are natural constraints preserved through the changes in taxonomy. Being parent-children (including grandparent) or mutual exclusive still holds true even after new nodes or branches are added. The appearance and statistical relations are also invariant to concept insertions or revisions since they are essentially grounded in the underlying data pool.

PROBABILISTIC CONCEPT TREES: Having discussed the observations on a taxonomy, we now describe a series of probabilistic models that account for the key relations and introduce probabilistic visual concept trees.

A naive Bayes model is a simple model for the two statistical-driven relationships. This is done by factoring the joint class-probabilities into the product of multiple independent conditional probabilities given a concept class label, as shown in $$P(y \mid x_{i:M}) \propto P(y) \prod_{i=1:M} P(x_i \mid y_c) \qquad (1)$$

Eq. 1

It estimates the class-conditional probabilities from data, and finds the most likely class based on the Bayesian rule. The naïve Bayesian thou of model has concept labels y are considered as binary, e.g. apple, not-apple. An extension to the binary naive Bayes model is to consider multi-valued labels that are mutually exclusive (e.g., y∈{apple, orange, peach, ... }), thus also capturing one of the semantic-driven relations, mutual exclusion. The form of the graphical model, and its inference remains unchanged in multi-class naive Bayes from its binary variant, while the posterior probabilities among the sibling concepts are better estimated.

The hierarchical parent-children relationship in concept semantics is notably missing from the naive Bayes models. Under this relationship, semantic concepts can be organized into a tree. It is easy to see that if we connect the y nodes from multiple naive Bayes models, the chain of hidden variables can represent a tree structured in its state-space, with a block-wise conditional probability table that set the conditional probabilities between non-parent-children node pairs to zero (e.g., P(fish|fruit)=0) (see FIG. 5).

Figure 4:
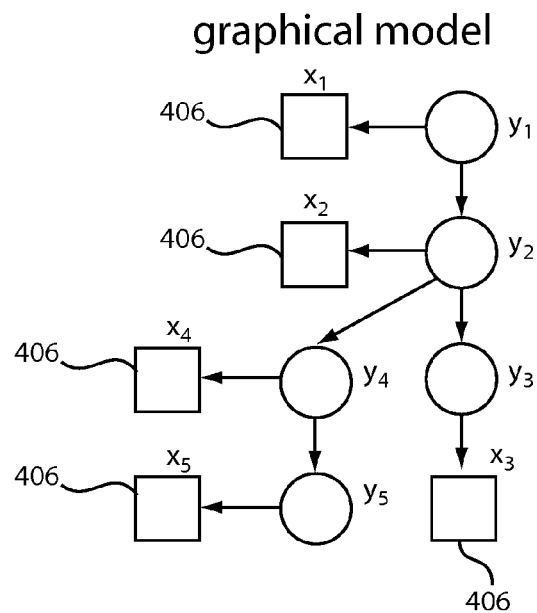
FIG. 4 is a diagram showing a graphical model generated from state space of FIG. 6 using a tree-structured Bayesian network in accordance with one illustrative embodiment.

Referring to FIG. 4, a diagram illustratively shows visual probabilistic concept tree formation, which includes a graphical model for large visual semantic taxonomy structures and its use in visual concept detection in accordance with one aspect of the present principles. A Bayes-network concept tree 404 is provided to model a faceted taxonomy in accordance with the present principles. The Bayes model 404 has been extended to consider multi-valued labels that are mutually exclusive. Boxes 406 (x nodes) include observed values while circles (y nodes) include hidden variables which can take one of the values specified in the faceted taxonomy. The tree-structured Bayesian network 404 in accordance with the present principles accounts for facets. Parent-child relationships are explicitly modeled by setting all conditional probabilities of parent-not-child to 0 (within each facet).

The visual concept trees explicitly account for parent-children relationships, mutual exclusion, multi-aspect labeling, observation uncertainties and any other related information. This concept tree structure may be employed to post-filter binary classifier outputs which were described above.

In accordance with one illustrative embodiment, a set of rules and constraints for construction and maintenance of a hierarchical multi-facet classification system/method are as follows. Images or artifacts are categorized. Each category represents a unique semantic idea and is represented as a node, called a category node. Each category node is optionally linked to one or more children nodes that reflect semantic decomposition of the parent category. Children nodes are all of one type—category nodes or facet nodes. Children category nodes follow a semantic categorical partitioning with respect to the parent nodes, and facet nodes follow a semantic perspective partitioning. Every child category folder must have at least one sibling. Children nodes of each parent are mutually exclusive and complete with respect to the semantics of the parent category. A facet node is complete with respect to the parent category and provides a perspective for further decomposing the parent category into parallel semantic categorical decompositions. Peer facet nodes are redundant with respect to each other. Other rules or modifications may be implemented as needed in accordance with specific applications.

With models for both semantic-driven and statistics-driven relations, we now design models that account for appearance-driven relations in addition to semantic and statistics-driven ones, i.e., multiple labels and multiple divisions in taxonomies. We notice that multiple classifications can be represented by multiple decision variables y simultaneously taking values on different state spaces, e.g., food from a plant (FIG. 6) can be a fruit or a vegetable, and at the same time it can also be from the root, leaves or stem of the plant. We also notice that a tree-structured taxonomy is naturally recursive, i.e., concepts that belong to fruit or those belonging to vegetable can be organized into a tree or forest themselves. In concept state-space, these two designs translate to a taxonomy "forest", and in a graphical model, this can be manifested with parallel branches in the hidden states. This leads to the tree-structured Bayesian network, dubbed Probabilistic Concept Tree, as shown in FIG. 4. This particular instance corresponds to the example taxonomy forest in FIG. 6.

Figure 5:
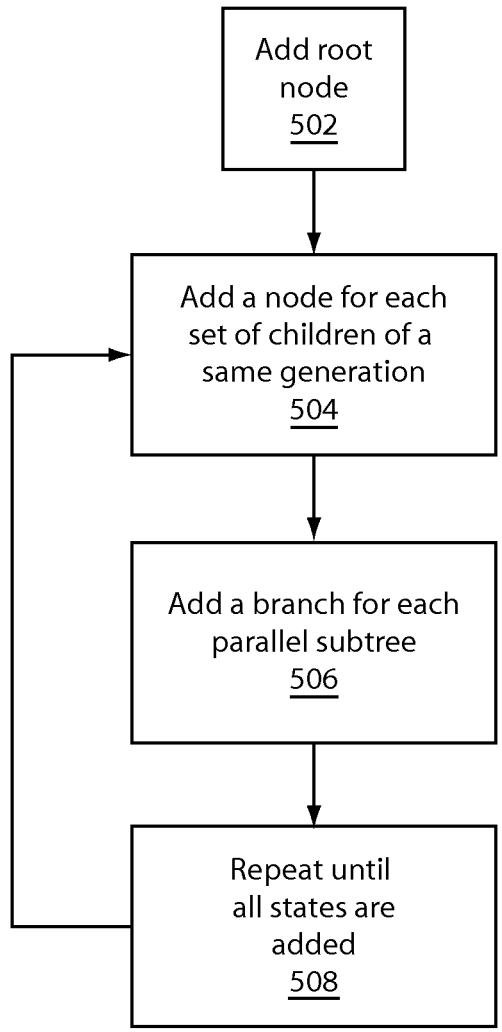
FIG. 5 is a block/flow diagram showing a method for generating the graphical model in FIG. 4 from the state space of FIG. 6.

Referring to FIG. 5, the tree-structured Bayesian network 404 includes a recursive construction from an existing taxonomy forest 604 (FIG. 6) by traversing the forest in the following manner. In block 502, add a node for a root of the tree. In block 504, add a node for each set of children of a same generation. In block 506, add a branch for each parallel subtree. In block 508, repeat steps 504 and 506 until all states are added to the tree. The parameters of probabilistic concept trees include the "emission" probabilities p(x|y) of seeing the observations x conditioned on their corresponding state y, the hierarchical conditional probabilities, a state variable yi and its parent $P(y_{ij}|y_{Pa_i})$.

Figure 6:
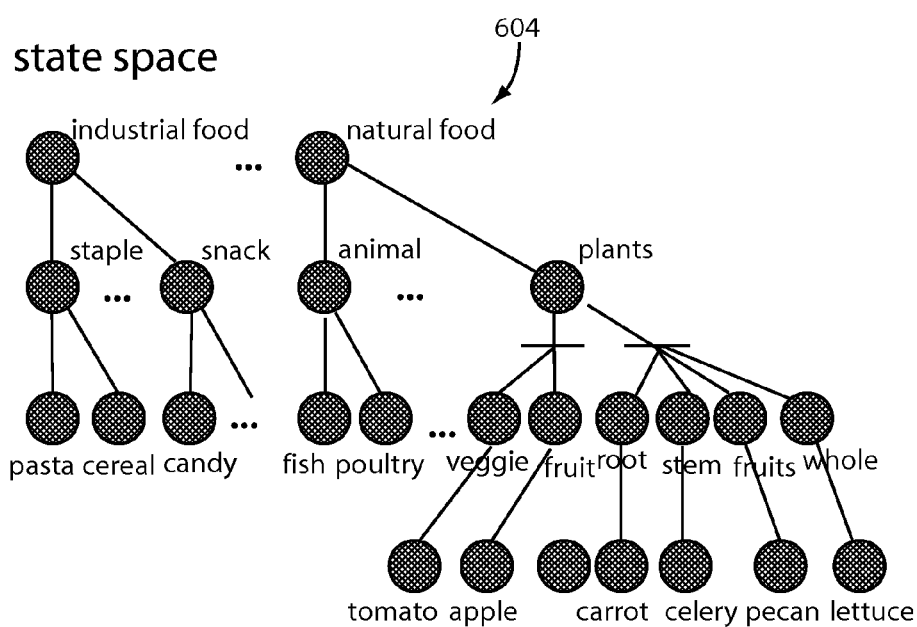
FIG. 6 is a diagram showing a state space for an illustrative taxonomy forest in accordance with one illustrative embodiment.

Referring to FIG. 6, we can use the recursive process of FIG. 5 to construct such a tree 404 from an existing taxonomy forest 604 (FIG. 6) by walking the forest in the following example steps: (1) Add a node for its root. e.g., $y_1 \in$ {natural food, industrial–food, . . . }. (2) Add a node for each set of children of the same generation e.g., $y_2 \in$ {staple, snack, plants, . . . }. (3) Add a branch for each parallel subtree. i.e., $y_3 \in$ {veggie, fruit, . . . } and $y_4 \in$ {root, strem, . . . } (4) Repeat steps (2) and (3) until all states are added to the tree.

As noted, the parameters of a probabilistic concept tree include the "emission" probabilities p(x|y) of seeing the observations x conditioned on their corresponding state y, the hierarchical conditional probabilities $P(y_i|y_{Pa_i})$ between a state variable $y_i$ and its parent variable $y_{Pa_i}$, as well as the prior $P(y_{root})$ on values that the root node can take. We use multi-variate Gaussian conditional probabilities between the real-valued observations $x_i$ and their corresponding state $y_i$. We use tabular conditionals between pairs of states $P(y_i|y_{Pa_i})$, since in a taxonomy forest 604 all states are discrete. Note that the concept tree construction needs block-wise assignment of conditional probabilities based on parent-children relationships in the taxonomy. For example, in FIGS. 4 and 6, the conditionals need to be set such that:

$\Sigma_{y_2 \in \{animal, vegetable, \ldots\}} P(y_2|y_1 = \text{natural food}) = 1;$ $\forall_{y_2} \in \{staple, snack, \ldots\}, P(y_2|y_1 = \text{natural food}) = 0.$ As we defined the network and its parameter constraints, the joint probability of all observations and hidden states in a concept tree in standard Bayes network notation follows, as shown in Eq. 2:

$$P(x_{1:M}, y_{1:M}) = P(y_{root}) \prod_{i=2}^{M} P(y_i | y_{Pa_i}) \sum_{i=1}^{M} P(x_i | y_i) \qquad (2)$$

We use expectation-maximization (EM) to estimate model parameters from training images, and use the junction tree algorithm to estimate posterior probabilities of P(y_i|x) (for multi-class classification). Other methods may also be employed. The model inference is carried out with the block-wise constraints in conditional probability tables. The inference on a probabilistic concept tree is efficient: linear in the number of nodes and quadratic in the size of the state-space. This can be implemented using known Bayes Network tools (BNT).

Probabilistic concept trees provide a model for a large semantic visual taxonomy. This model is distinct in that it accounts for at least two robust semantic relationships (parent-children and mutual exclusion) as well as the appearance-driven and statistics-driven relations in a visual taxonomy. The model was introduced in the non-limiting context of several simpler variants, and its parameterization and inference were presented as a special case of a Bayesian network. We have observed significant improvement in classification accuracy on a large collection of web images. The current taxonomy structure excludes spatial or temporal composition of concept, and such composition would be desirable for recognizing object layout or temporal activities.

The present embodiments provide a useful organizational system and method useful for content service providers. These service providers and others need applications with high-performing content labeling. Automated tagging of content needs to be precise, reliable, diverse, scalable and adaptable to enable new business models and bring in new revenue. The present embodiments have significant benefits which include: scaling a large pool of automatic semantic labels to a most descriptive set of labels for a given digital item; effectively leveraging the visual semantics to more precisely label the unseen content; increasing the reliability for automated content tagging; and increasing the relevance of automated content description thus improving content monetization applications.

Figure 7:
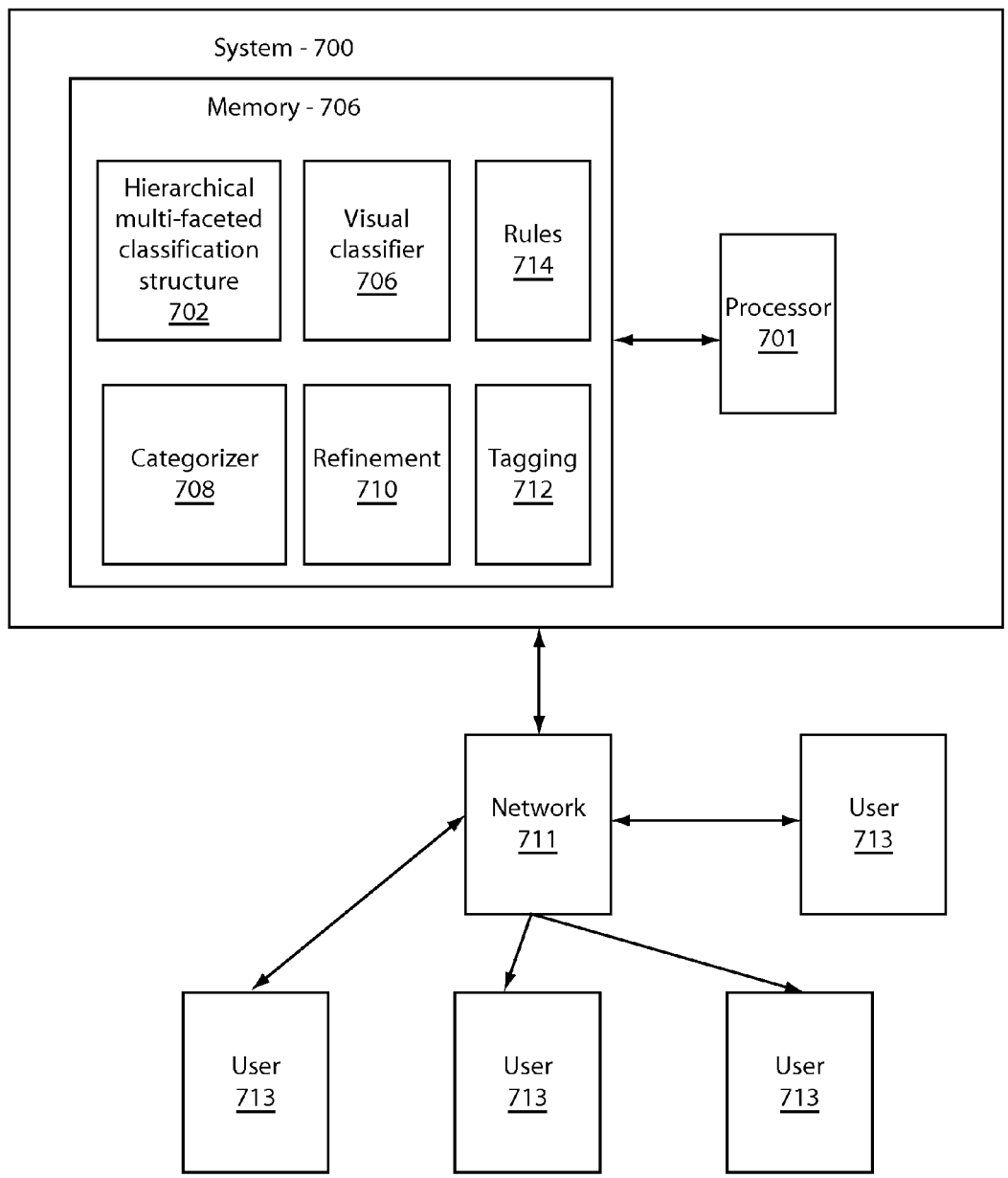
FIG. 7 is a block/flow diagram showing a system for constructing and using a multi-faceted classification structure in accordance with one illustrative embodiment.

Referring to FIG. 7, a system 700 for constructing, storing and using a hierarchical multi-faceted classification structure 702 is illustratively depicted in accordance with one illustrative embodiment. System 700 includes a processor 701 to process system instructions and perform functions in accordance with the present principles. System 700 includes a visual classifier module 704 stored in computer readable storage media or memory 706 and configured to classify a plurality of visual categories into a multi-relational reference ontology that accounts for a plurality of different types of relationships. The visual classifier 704 may be built (trained) by employing a multi-faceted classification taxonomy and collecting media artifacts from a plurality of visual categories using multi-facet logical relationships such that the media artifacts collected are guaranteed to be mutually exclusive with a given target class.

A categorizing module 708 is also stored in memory 706 and is configured to place one or more media artifacts into the plurality of visual categories. A refinement module 710 may be integrated with the categorizing module 708 or be a stand-alone module. The refinement module 710 is configured to refine an output of the categorizing module based on at least one of faceted ontology relationships and constraints from the multi-relational reference ontology. The hierarchical multi-faceted classification structure 704 is stored in memory 706 and configured to relate the one or more media artifacts (preferably a large number) in the multi-relational reference ontology.

System 700 may include a server for a network (e.g., Internet) service provider on a network 711 for serving users 713. The hierarchical multi-faceted classification structure 704 may be employed to search content for visual images and video with higher accuracy and repeatable results. The hierarchical multi-faceted classification structure 704 permits images to be reliably classified as well as reliable queried depending on the application. The hierarchical multi-faceted classification structure 704 is defined by set of rules for creating, editing and maintaining a multi-relational visual ontology.

A tagging module 712 is configured to perform content-based tagging of the one or more media artifacts using refined categories. As a result of better categorization refinement, better and more useful tags are provided on artifacts.

The visual classifier 704 may be employed to construct the hierarchical multi-faceted classification structure 702 in accordance with a plurality of rules 716. In one particularly useful embodiment, the rules 716 may include representing categories as a unique semantic idea having a category node; linking each category node to one or more children nodes, if present, that reflect a semantic decomposition of a parent category such that children nodes are all category nodes or facet nodes; partitioning children category nodes using a semantic category with respect to the parent nodes wherein every children category folder has at least one sibling and children nodes of each parent are mutually exclusive and complete with respect to the semantics of the parent category; and semantic perspective partitioning facet nodes where a facet node is complete with respect to the parent category and provides a perspective for further decomposing the parent category into parallel semantic categorical decompositions and peer facet nodes are redundant with respect to each other.

Having described preferred embodiments of a system and method for multi-facet classification scheme for cataloging of information artifacts (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for constructing a hierarchical multi-faceted classification structure comprising:
classifying a plurality of visual categories into a multi-relational reference ontology that accounts for a plurality of different types of relationships, the multi-relational reference ontology including a plurality of faceted nodes of visual categories that can co-occur in an image and a plurality of regular nodes of visual categories that are mutually exclusive in the image;
determining a plurality of content-based tags for one or more media artifacts, wherein each content-based tag of the plurality of content-based tags is determined based on a confidence score using the plurality of visual categories;
for a set of conflicting content-based tags from the plurality of content-based tags, removing all but one conflicting content-based tag from visual categories that are mutually exclusive for each of the one or more media artifacts;
storing the multi-relational reference ontology, remaining content-based tags of the plurality of content-based tags, and the one or more media artifacts with relationships as a hierarchical multi-faceted classification structure in computer readable memory storage; and
retrieving at least one media artifact from the one or more media artifacts by at least one content-based tagging application using the multi-relational reference ontology and the remaining content-based tags.

2. The method as recited in claim 1, wherein refining includes refining the categorizing based on at least one of faceted ontology relationships and constraints from the multi-relational reference ontology.

3. The method as recited in claim 2, wherein the at least one of faceted ontology relationships and constraints includes at least one of mutual exclusivity, co-occurrence and relatedness.

4. The method as recited in claim 2, wherein refining includes at least one of selecting, boosting and excluding category labels using relationship rules extracted from the multi-relational reference ontology.

5. The method as recited in claim 2, wherein refining includes at least one of selecting, boosting and excluding category labels using statistical methods based on relationships in the multi-relational reference ontology.

6. The method as recited in claim 2, wherein refining includes at least one of selecting, boosting and excluding category labels based on detecting confidence scores for categories.

7. The method as recited in claim 2, wherein refining includes at least one of selecting, boosting and excluding category labels based on characteristics of categories in the multi-relational reference ontology.

8. The method as recited in claim 1, wherein the plurality of different types of relationships includes at least one of parent-child relationships, sibling relationships, negation relationships and relationships among visual semantic concepts.

9. The method as recited in claim 1, wherein the hierarchical multi-faceted classifications structure is constructed in accordance with plurality of rules comprising:
representing categories as a unique semantic idea having a category node;
linking each category node to one or more children nodes, if present, that reflect a semantic decomposition of a parent category such that children nodes are all category nodes or facet nodes;
partitioning children category nodes using a semantic category with respect to parent nodes wherein every children category folder has at least one sibling and children nodes of each parent are mutually exclusive and complete with respect to the semantics of the parent category; and
semantic perspective partitioning facet nodes where a facet node is complete with respect to the parent category and provides a perspective for further decomposing the parent category into parallel semantic categorical decompositions and peer facet nodes are redundant with respect to each other.

10. The method as recited in claim 1, wherein categorizing includes decomposing a parent node of the multi-relational reference ontology as parallel decompositions of faceted nodes.

11. The method as recited in claim 1, wherein the plurality of faceted nodes and the plurality of regular nodes are orthogonally partitioned with respect to each other to indicate respective membership in a corresponding one of the plurality of faceted nodes and the plurality of regular nodes, and wherein a first partitioning orientation indicates membership to the plurality of faceted nodes and a second partitioning orientation orthogonal to the first partitioning orientation indicates membership to the plurality of regular nodes.

12. The method as recited in claim 1, wherein conflicting sibling nodes that appear as mutually exclusive in the multi-relational reference ontology are eliminated by selecting at most one of the conflicting sibling nodes for recommendation for the image.

13. The method as recited in claim 1, wherein each of the plurality of faceted nodes functions as a respective root node for a respective subset of the plurality of regular nodes, the multi-relational reference ontology includes a plurality of horizontal planes, and co-occurrence between any of the plurality of faceted nodes is indicated by being on a same one of the plurality of horizontal planes.

14. The method as recited in claim 13, wherein the multi-relational reference ontology includes a plurality of vertical planes, and co-occurrence between any of the plurality of regular nodes is indicated by being on a same one of the plurality of vertical planes.

15. A computer readable storage medium comprising a computer readable program for constructing a hierarchical multi-faceted classification structure, wherein the computer readable program when executed on a computer causes the computer to perform the steps of:
classifying a plurality of visual categories into a multi-relational reference ontology that accounts for a plurality of different types of relationships, the multi-relational reference ontology including a plurality of faceted nodes of visual categories that can co-occur in an image and a plurality of regular nodes of visual categories that are mutually exclusive in the image;
categorizing one or more media artifacts into the plurality of visual categories;
refining the categorizing to provide refined categories;
performing content-based tagging of the one or more media artifacts based upon a confidence score using the refined categories to determine a plurality of content-based tags for the plurality of media artifacts;
for a set of conflicting content-based tags from the plurality of content-based tags, removing all but one conflicting content-based tag from visual categories that are mutually exclusive for each of the one or more media artifacts;
storing the multi-relational reference ontology, remaining content-based tags of the plurality of content-based tags, and the one or more media artifacts with relationships as the hierarchical multi-faceted classification structure in computer readable memory storage; and
retrieving at least one media artifact from the one or more media artifacts by at least one content-based tagging application using the multi-relational reference ontology and the remaining content-based tags.

16. The computer readable storage medium as recited in claim 15, wherein classifying a plurality of visual categories includes constructing the hierarchical multi-faceted classification structure in accordance with a plurality of rules including:
representing categories as a unique semantic idea having a category node;
linking each category node to one or more children nodes, if present, that reflect a semantic decomposition of a parent category such that children nodes are all category nodes or facet nodes;
partitioning children category nodes using a semantic category with respect to parent nodes wherein every children category folder has at least one sibling and children nodes of each parent are mutually exclusive and complete with respect to the semantics of the parent category; and
semantic perspective partitioning facet nodes where a facet node is complete with respect to the parent category and provides a perspective for further decomposing the parent category into parallel semantic categorical decompositions and peer facet nodes are redundant with respect to each other.

17. The computer readable storage medium as recited in claim 15, wherein refining includes refining the categorizing based on at least one of faceted ontology relationships and constraints from the multi-relational reference ontology.

18. A system for constructing a hierarchical multi-faceted classification structure comprising:
a visual classifier module stored in computer readable storage media and configured to classify a plurality of visual categories into a multi-relational reference ontology that accounts for a plurality of different types of relationships, the multi-relational reference ontology including a plurality of faceted nodes of visual categories that can co-occur in an image and a plurality of regular nodes of visual categories that are mutually exclusive in the image;

a categorizing module configured to place one or more media artifacts into the plurality of visual categories;

a refinement module configured to refine an output of the categorizing module based on at least one of faceted ontology relationships and constraints from the multi-relational reference ontology to provide refined categories;

a tagging module configured to perform content-based tagging of the one or more media artifacts based upon a confidence score using the refined categories to determine a plurality of content-based tags for the one or more media artifacts and, for a set of conflicting content-based tags from the plurality of content-based tags, to remove all but one conflicting content-based tag from visual categories that are mutually exclusive for each of the one or more media artifacts;

a memory configured to store the multi-relational reference ontology, the remaining content-based tags of the plurality of content-based tags, and the one or more media artifacts with relationships represented as a hierarchical multi-faceted classification structure, the hierarchical multi-faceted classification structure being configured to relate the one or more media artifacts in the multi-relational reference ontology based on the remaining content-based tags and to enable a content-based tagging application; and a processor configured to retrieve at least one media artifact from the one or more media artifacts by at least one content-based tagging application using the multi-relational reference ontology and the remaining content-based tags.

19. The system as recited in claim 18, wherein the at least one of faceted ontology relationships and constraints includes at least one of mutual exclusivity, co-occurrence and relatedness, and wherein the plurality of different types of relationships includes at least one of parent-child relationships, sibling relationships, negation relationships and relationships among visual semantic concepts.

20. The system as recited in claim 18, wherein the refinement module includes at least one of selects, boosts and excludes category labels using at least one of relationship rules extracted from the multi-relational reference ontology; statistical methods based on relationships in the multi-relational reference ontology; confidence scores for categories and characteristics of categories in the multi-relational reference ontology.

21. The system as recited in claim 18, wherein the visual classifier constructs the hierarchical multi-faceted classification structure in accordance with a plurality of rules which includes:

representing categories as a unique semantic idea having a category node;

linking each category node to one or more children nodes, if present, that reflect a semantic decomposition of a parent category such that children nodes are all category nodes or facet nodes;

partitioning children category nodes using a semantic category with respect to parent nodes wherein every children category folder has at least one sibling and children nodes of each parent are mutually exclusive and complete with respect to the semantics of the parent category; and semantic perspective partitioning facet nodes where a facet node is complete with respect to the parent category and provides a perspective for further decomposing the parent category into parallel semantic categorical decompositions and peer facet nodes are redundant with respect to each other.

* * * * *